United States Patent
Mayor

(10) Patent No.: US 9,949,200 B2
(45) Date of Patent: Apr. 17, 2018

(54) CENTRALIZED BEACON MANAGEMENT SERVICE

(71) Applicant: Apple Inc., Cupertino, CA (US)

(72) Inventor: Robert Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 14/288,308

(22) Filed: May 27, 2014

(65) Prior Publication Data

US 2015/0351008 A1    Dec. 3, 2015

(51) Int. Cl.
| | |
|---|---|
| *H04B 7/00* | (2006.01) |
| *H04W 48/16* | (2009.01) |
| *H04W 4/00* | (2018.01) |
| *G06F 17/30* | (2006.01) |
| *G01S 5/02* | (2010.01) |

(Continued)

(52) U.S. Cl.
CPC .............. *H04W 48/16* (2013.01); *G01S 5/02* (2013.01); *G06F 17/3087* (2013.01); *H04W 4/008* (2013.01); *G06Q 30/00* (2013.01); *H04W 64/00* (2013.01); *H04W 84/18* (2013.01)

(58) Field of Classification Search
CPC ....... H04W 4/008; H04W 4/02; H04W 4/005; H04W 4/021; H04W 4/043; H04W 64/00; H04W 4/023; H04W 84/18; H04W 8/005; H04W 12/02; H04W 24/00; H04W 28/06; H04W 40/244; H04W 48/08; H04W 48/12; H04W 48/16; G06Q 30/0261; G06Q 30/0267; G06Q 30/0269; G06Q 30/0281; G06Q 30/02; G06Q 30/0239; G06Q 30/0242; G06Q 30/0255; G06Q 30/0256; G06Q 30/0257; G06Q 20/20; G06Q 20/3224; G06Q 20/327; G06Q 30/00; G06Q 30/0271; G06Q 30/0633

See application file for complete search history.

(56) References Cited

U.S. PATENT DOCUMENTS

| | | |
|---|---|---|
| 6,754,500 B1 | 6/2004 | He |
| 7,397,424 B2 | 7/2008 | Houri |

(Continued)

FOREIGN PATENT DOCUMENTS

| | | |
|---|---|---|
| CN | 103874198 | 6/2014 |
| DE | 10 2008 024248 | 12/2009 |

OTHER PUBLICATIONS

U.S. Appl. No. 13/905,552, filed May 30, 2013, Range Class Estimation for Radio Frequency Devices, Marti et al.

(Continued)

*Primary Examiner* — Golam Sorowar

(74) *Attorney, Agent, or Firm* — Fish & Richardson P.C.

(57) ABSTRACT

A centralized beacon management service includes a beacon database for storing beacon information for different enterprises. The beacon database includes tables that associate beacons deployed by enterprises with beacon information. The beacon information can include information for commissioning the beacons and payload data to be broadcast by the beacon to client devices within communication range of the beacon. Based on proximity sensing data provided by a client device, beacon information is retrieved and sent to the client device over a communication channel (e.g., WiFi, cellular) established with the client device.

20 Claims, 7 Drawing Sheets

(51) Int. Cl.
*G06Q 30/00* (2012.01)
*H04W 64/00* (2009.01)
*H04W 84/18* (2009.01)

(56) References Cited

U.S. PATENT DOCUMENTS

| | | |
|---|---|---|
| 7,856,234 B2 | 12/2010 | Alizadeh-Shabdiz et al. |
| 7,899,583 B2 | 3/2011 | Mendelson |
| 7,924,149 B2 | 4/2011 | Mendelson |
| 8,054,219 B2 | 11/2011 | Alizadeh-Shabdiz |
| 8,223,074 B2 | 7/2012 | Alizadeh-Shabdiz |
| 8,369,264 B2 | 2/2013 | Brachet et al. |
| 8,478,297 B2 | 7/2013 | Morgan et al. |
| 8,836,580 B2 | 9/2014 | Mendelson |
| 8,866,673 B2 | 10/2014 | Mendelson |
| 8,896,485 B2 | 11/2014 | Mendelson |
| 8,941,485 B1 | 1/2015 | Mendelson |
| 8,983,493 B2 | 3/2015 | Brachet et al. |
| 9,020,687 B2 | 4/2015 | Mendelson |
| 9,204,251 B1 | 12/2015 | Mendelson |
| 9,204,257 B1 | 12/2015 | Mendelson |
| 9,460,388 B2 | 10/2016 | Marti et al. |
| 2003/0228846 A1 | 12/2003 | Berliner et al. |
| 2010/0305779 A1 | 12/2010 | Hassan et al. |
| 2011/0009068 A1 | 1/2011 | Miura |
| 2011/0287795 A1 | 11/2011 | Cahill |
| 2011/0306307 A1 | 12/2011 | Kauppert et al. |
| 2011/0306357 A1* | 12/2011 | Alizadeh-Shabdiz ............... G01S 5/0278 455/456.1 |
| 2012/0046045 A1 | 2/2012 | Gupta et al. |
| 2012/0064855 A1 | 3/2012 | Mendelson |
| 2013/0065584 A1* | 3/2013 | Lyon ............... H04W 28/06 455/434 |
| 2014/0180817 A1* | 6/2014 | Zilkha ............... G06Q 30/02 705/14.55 |
| 2014/0220883 A1* | 8/2014 | Emigh ............... H04H 20/61 455/3.01 |
| 2014/0335897 A1* | 11/2014 | Clem ............... G08G 1/0112 455/456.3 |
| 2014/0358835 A1 | 12/2014 | Marti et al. |
| 2015/0005011 A1* | 1/2015 | Nehrenz ............... H04W 4/02 455/456.3 |
| 2015/0334548 A1* | 11/2015 | Liu ............... H04W 72/0473 370/329 |

OTHER PUBLICATIONS

International Search Report and Written Opinion of the International Searching Authority, PCT Application PCT Application Serial No. PCT/US2014/040066, dated Sep. 9, 2014, 11 pp.

* cited by examiner

BEACON DATABASE – ACME CORPORATION

| Proximity ID (UUID) | Major | Minor | TX Power (dBm) | PDU Type | PDU Payload |
|---|---|---|---|---|---|
| B9407F20-0000-1000-8000-00805F9B34FB | 001 | 001 | 10 | 0010 | http://weeklyad.acme.com/redwood-city-ca-94063/homepage# |
| B9407F20-0000-1000-8000-00805F9B34FB | 001 | 002 | 5 | 0010 | http://weeklyad.acme.com/redwood-city-ca-94063/electronics?sort=title# |
| B9407F20-0000-1000-8000-00805F9B34FB | 001 | 003 | 0 | 0010 | http://weeklyad.acme.com/redwood-city-ca-94063/electronics-cell-phones?code=Acme-140511&sort=title# |
| B9407F20-0000-1000-8000-00805F9B34FB | 002 | 001 | 10 | 0010 | http://weeklyad.acme.com/mountain-view-ca-94040/homepage# |
| B9407F20-0000-1000-8000-00805F9B34FB | 002 | 002 | 5 | 0010 | http://weeklyad.acme.com/mountain-view-ca-94040/groceries?sort=title# |
| B9407F20-0000-1000-8000-00805F9B34FB | 002 | 003 | 0 | 0010 | http://weeklyad.acme.com/mountain-view-ca-94040/groceries-produce?code=Acme-144311&sort=title# |

FIG. 2A

BEACON DATABASE – ACME CORPORATION

| Proximity ID (UUID) | Major | Minor | Range Class | Message |
|---|---|---|---|---|
| B9407F20-0000-1000-8000-00805F9B34FB | 001 | 001 | Far | Welcome To Acme! <br> click for store map |
| B9407F20-0000-1000-8000-00805F9B34FB | 001 | 002 | Near | 25% off cell phones <br> click for details |
| B9407F20-0000-1000-8000-00805F9B34FB | 001 | 002 | Immediate | iPhone® 5 <br> click for details |

FIG. 2B

CENTRALIZED BEACON MANAGEMENT SERVICE

TECHNICAL FIELD

This disclosure relates generally to radio frequency (RF) beacon technology and location-based services.

BACKGROUND

Bluetooth® low energy (BLE) (also referred to as Bluetooth® Smart) is a wireless personal area network (PAN) technology that can be used for a variety of client device applications and is intended to provide reduced power consumption and cost while maintaining a similar communication range as Bluetooth®. Many mobile operating systems for smart phones, tablet computers and wearable devices support Bluetooth® Smart. The technical specifications for BLE are described in Bluetooth® Core Specification 4.0, which is a public document made available online by Bluetooth® Special Interest Group (SIG).

One potential application provided by BLE technology is proximity sensing. BLE beacons broadcast a Universally Unique Identifier (UUID), which can be detected by a compatible application or operating system running on a client device and used to determine the physical location of the client device or trigger an action on the client device.

SUMMARY

A centralized beacon management service includes a beacon database for storing beacon information for different enterprises. The beacon database includes tables that associate beacons deployed by enterprises with beacon information. The beacon information can include information for commissioning the beacons and payload data to be broadcast by the beacon to client devices within communication range of the beacon. Based on proximity sensing data provided by a client device, beacon information is retrieved and sent to the client device over a communication channel (e.g., WiFi, cellular) established with the client device.

In some implementations, an enterprise administrator can interact with a beacon management service through a web-based beacon management portal provided by the beacon management service. The portal allows the administrator to log on to an enterprise account to commission beacons and specify payload data to be broadcast by the beacons. In some implementations, an enterprise can commission beacons and specify payload data through a data feed (e.g., web or syndicated feed) with the beacon management service, which allows the enterprise to interface its own proprietary systems (e.g., ad targeting tools and applications) with the beacon management service.

In some implementations, a method comprises: receiving, by a server computer, proximity sensing data aggregated by a client device physically proximate to a beacon in a beacon environment associated with an enterprise, the proximity sensing data including data identifying the beacon environment and the beacon; retrieving beacon information from a database of a centralized beacon management service using the proximity sensing data, where the beacon management service manages beacon environments for the enterprise and a plurality of other enterprises; and sending the beacon information to the client device.

In some implementations, a method comprises: receiving, by a server computer, proximity sensing data aggregated by a client device physically proximate to a beacon in a beacon environment associated with an enterprise, the proximity sensing data including data identifying the beacon environment and the beacon; retrieving beacon information from a database of a centralized beacon management service using the proximity sensing data, where the beacon management service manages beacon environments for the enterprise and a plurality of other enterprises; and sending the beacon information to the client device.

Other implementations are directed to systems, devices and non-transitory, computer-readable storage mediums. Particular implementations disclosed herein provide one or more of the following advantages. A centralized beacon management service enables a plurality of enterprises to manage beacons (e.g., beacon commissioning) and proximity sensing applications (e.g., advertising events).

The details of the disclosed implementations are set forth in the accompanying drawings and the description below. Other features, objects and advantages are apparent from the description, drawings and claims.

DESCRIPTION OF DRAWINGS

FIGS. 2A and 2B are example database tables in a beacon database of the centralized beacon management service.

The same reference symbol used in various drawings indicates like elements.

DETAILED DESCRIPTION

Example System

Figure 1:
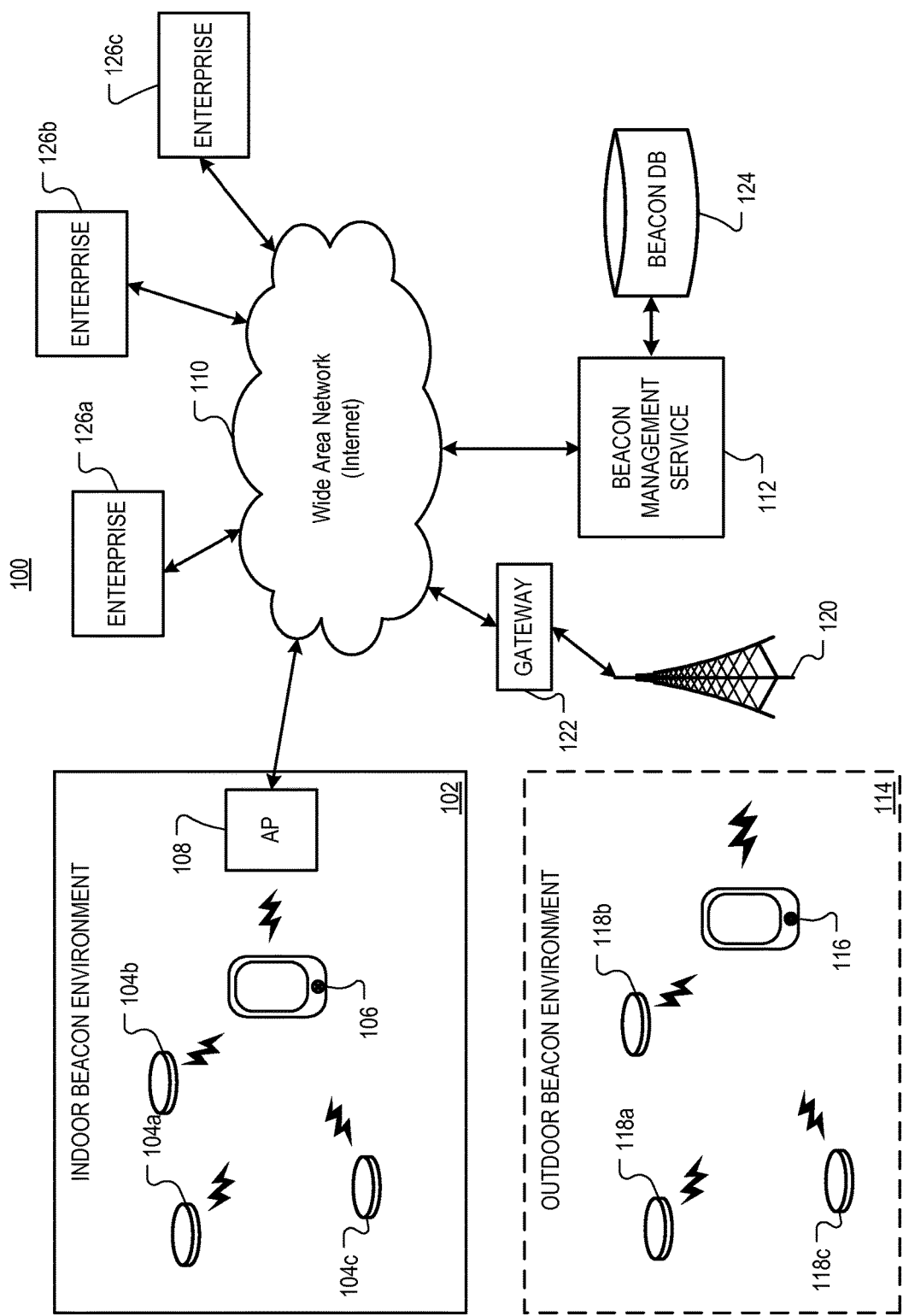
FIG. 1 illustrates an example operating environment for a centralized beacon management service.

FIG. 1 illustrates an example operating environment 100 for a centralized beacon management service 112. Beacon management service 112 manages beacons for a plurality of enterprises 126a-126c at various indoor or outdoor locations 102, 114 (hereafter referred to as "beacon environments"). Generally, a beacon environment is any indoor or outdoor environment where at least one beacon is deployed. Beacon environments 102, 114 can include but are not limited to: retail stores, mass transit stations, museums, exhibitions, tradeshows, festivals, parking lots and structures, sporting and entertainment venues, airports, hospitals, libraries, etc. An "enterprise" as defined herein is any entity that deploys at least one beacon at a geographic location, including but not limited to: businesses, companies, firms, public/private organizations, government agencies/institutions, etc.

In some implementations, beacon management service 112 communicates with enterprises 126a-126c through network 110 (e.g., the Internet). Beacon management service 112 can be implemented using one or more server computers. At least one server computer can deliver web pages for a beacon management portal that can be accessed by authorized enterprise personnel or administrators using a browser running on an administrator computer, as described in reference to FIG. 6. Beacon management service 112 can access beacon database 124, which is configured to store beacon information as described in reference to FIGS. 2A and 2B.

Client device 106 operating in beacon environment 102 communicates wirelessly with beacon management service 112 through access point (AP) 108 (e.g., WiFi access point) and network 110. Client device 106 includes a wireless transceiver that can detect radio frequency (RF) signals broadcast from beacons 104a-104c when client device 106 is within communication range of beacons 104a-104c. In the example shown, beacon environment 102 is an indoor environment (e.g., a retail chain store).

Client device 114 operating in beacon environment 114 communicates wirelessly with beacon management service 112 through cell tower 120, gateway 122 and network 110. Client device 116 includes a wireless transceiver that can detect RF signals broadcast from beacons 118a-118c when client device 116 is within communication range of beacons 118a-118c. In the example shown, beacon environment 114 is an outdoor environment (e.g., a musical festival).

Beacons 104, 118 can be BLE beacons that comply with Bluetooth Core Specification 4.0 (hereafter referred to as the "BT Specification"). Any desired number of beacons can be deployed in beacon environments 102, 114. For example, beacons can be deployed in a retail store at an entrance, section (e.g., electronics section) and display (e.g., cell phone display).

Beacons 104, 118 broadcast advertising packets referred to as PDUs that include headers that can be detected by client devices 106, 116 when configured to run in scan mode. When a beacon wants to broadcast, it starts an advertising event, where the same advertising packet is transmitted sequentially on each of three advertising channels as defined in the BT Specification. There are four different types of advertising packets defined by the BT Specification: non-connectable advertising, discoverable advertising, general advertising and directed advertising. For beacons broadcasting non-connectable advertising packets, the beacon transmits a string of data but does not respond to a request from a client device to make a secure connection. The string can include information (e.g., a Uniform Resource Locator (URL)) directing a browser running on the client device to a secondary online source of information, such as website accessible by cellular or WiFi communication links.

An example BLE protocol for proximity sensing is iBeacon® protocol developed by Apple Inc. (Cupertino Calif.). iBeacon® protocol specifies data elements or identifiers that can be programmed by users, as described in reference to FIGS. 2A-2B. iBeacon® allows client devices 106, 116 to scan and detect advertising packets from an iBeacon® as a background process. Once an application is installed on the client device, it can remain dormant until an appropriate iBeacon® is discovered. Advertising packets can be filtered and directed to specific applications installed on the client device or used to initiate actions on the client device with or without user intervention.

Beacon database 124 provides a centralized data store for enterprises to store their proprietary beacon information. Beacon database 124 can be a single database or a distributed database. Beacon database 124 can be a relational database that includes database tables. Beacon database 124 can include a database management system (DBMS) and schema that allows multiple enterprises to store and access beacon information for beacons used in their respective beacon environments.

In some implementations, each enterprise can be assigned one or more database tables that can be accessed through a beacon manager portal provided by beacon management service 112. As previously described, the enterprise can read and write beacon information to its database tables using the portal or a data feed. Beacon information can include any information related to the commissioning and operation of beacons, including but not limited to: proximity ID, major, minor, transmitted signal strength, PUD type, PDU payload data, device filter (e.g., white list), advertising event timing or any other information or content.

FIG. 2A is an example database table for a fictitious Acme Corporation. Each row of the database represents a beacon and each column represents beacon information. The database table can include more or few columns or rows based on the application.

In the example shown, Acme Corporation is a retail chain operator with two stores located in Redwood City and Mountain View Calif. Proximity IDs in column one can be assigned to various subsidiaries of Acme Corporation. For this example, a single UUID is assigned to Acme Corporation. The major values in column two identify each Acme store that has a beacon environment. For example, the Redwood City store is identified by the major value 1 and the Mountain View store is identified by the major value 2. In the Redwood City store, Acme has deployed BLE beacons at the entrance, at the electronics section and at a cell phone display in the electronics section. These three beacons are identified by minor values in column three as 1, 2 and 3.

In the Mountain View store, Acme has deployed BLE beacons at the entrance, at the grocery section and at a produce display in the grocery section. These three individual beacons are identified by minor values in column three as 1, 2 and 3.

Column four allows Acme to program the transmission (TX) power of individual beacons. An example TX power range can be −23 dBm to +10 dBm. In this example, Acme programmed the beacon at the entrance to have a high transmission power (e.g., +10 dBm) to ensure broadcasts from the beacon can be detected in scans by customer client devices outside the store entrance. The beacon deployed at the entrance transmits a PDU payload that includes a URL to the Acme home page, where featured weekly ads for the Redwood City store can be accessed by the customer via a browser.

The beacon at the electronics section is programmed by Acme to have a transmission power (e.g., 5 dBm) that is lower than the entrance beacon and higher than the beacon at the cell phone display to ensure broadcasts from the beacon can be detected in scans by customer client devices near the electronics section. The electronics section beacon transmits a PDU payload that includes a URL to a weekly ad page for electronics.

The beacon at the cell phone display is programmed by Acme to have a a transmission power lower than the other two beacons (e.g., 0 dBm) to ensure broadcasts from the beacon are detected in scans by customer client devices near the cell phone display. The display beacon transmits a PDU payload that includes a URL to a weekly ad page that includes cell-phone ads.

Column five of the database table includes PDU type; a parameter described in the BT Specification. The PDU type (a 4-digit number) specifies an advertising event that is one of a connectable, undirected advertising event, a connectable, directed advertising event, a non-connectable, undirected advertising event, scan request, scan response, connection request and scannable and undirected advertising event. The term "connectable" means the beacon can respond to a request from client devices to establish a secure connection with the beacon and/or beacon management service 112. In the example shown, a non-connectible, undirected advertising event is specified for all Acme beacons (0010).

Referring to FIG. 2B, in some implementations the database table can include an association between a received signal strength indicator (RSSI) measured by a client device and a message pushed to the client device using, for example, a push notification service.

In some implementations, a range class (e.g., Far, Near, Immediate) can be transmitted to beacon management service 112 by a client device over a WiFi or cellular communication channel. The range class can be used by beacon management service 112 to trigger an advertising event, such as pushing a message to a client device. In the example shown, when a client device is "Far" from the store entrance beacon at Acme's Redwood City store (major=001, minor=001), the message "Welcome To Acme!" is displayed on the client device. A link is also displayed to access a store map. When a client device is "Near" the electronics section beacon (major=001, minor=002), the message "25% off cell phones" is displayed on the client device. A link is also displayed to access additional details regarding the discount offer. When a client device is "Immediate" from the display beacon (major=001, minor=003), the message "iPhone® 5" is displayed. A link is also displayed to access more details regarding iPhone® 5.

In some implementations, beacon information can include one or more time parameters that specify when a given message is broadcast by a beacon (e.g., broadcast only during business hours) or the frequency of the broadcasts (e.g., how many times a message is broadcast in an hour). In some implementations, client device context information, such as the current location of a client device (e.g., computed by GPS, WiFi, cellular) or its motion state (e.g., moving, stationary, in vehicle, on mass transit, walking, jogging, running) computed from inertial sensor data (e.g., accelerometer or gyro data), can be included in the proximity sensing data and sent to beacon management service 112 where it can be used to retrieve beacon information. An enterprise may specify different beacon information (e.g., different messages) for different contexts of a client device.

Example Processes

Figure 3:
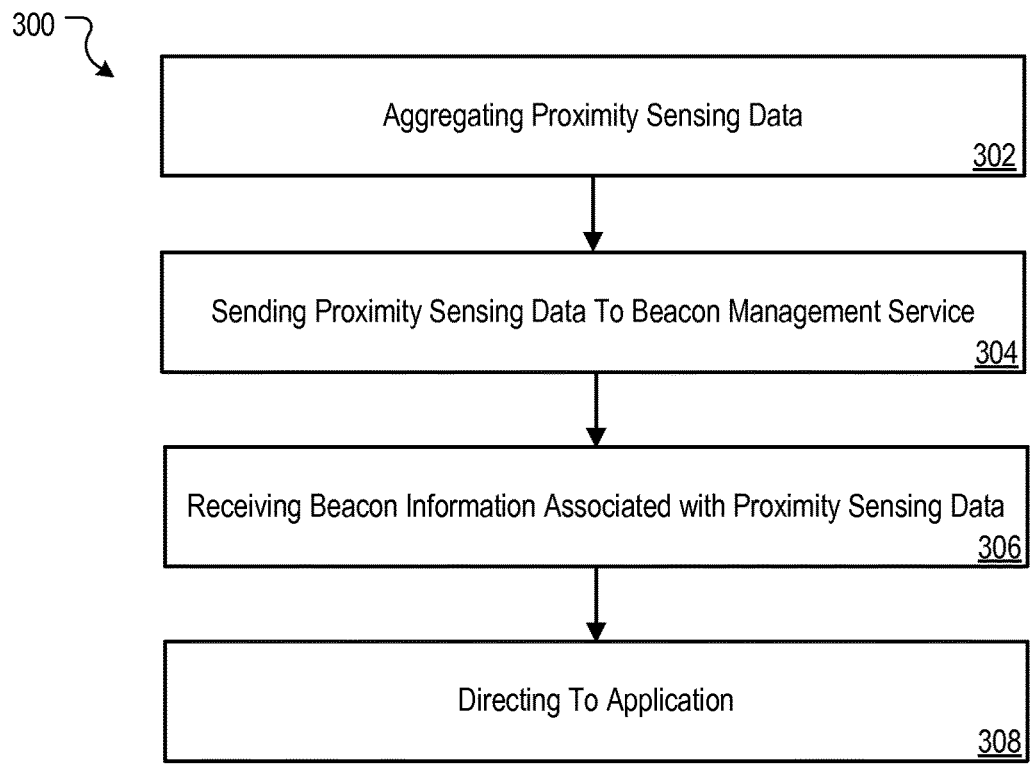
FIG. 3 is an example process performed by client devices communicating with the beacon management service illustrated in FIG. 1.

FIG. 3 is an example process performed by client devices communicating with the beacon management service illustrated in FIG. 1. Process 300 can be implemented in client devices having example device architecture 700, as described in reference to FIG. 7.

In some implementations, process 300 can begin when a client device aggregates proximity sensing data (302). For example, a client device in a beacon environment detects a beacon while in scan mode. The client device receives an advertising packet from the beacon that includes a header and payload. The client device also calculates an RSSI and/or range class (e.g., Far, Near, Immediate) from received signal strength. In some implementations, the client device determines its location using a positioning technology (e.g., WiFi, cellular, GPS). A clock on client device provides timestamps indicating the time of beacon detection and the time of location determination. Context data can be aggregated by the client device and added to the proximity sensing data, such as whether the client device is in motion or stationary.

Process 300 can continue by sending the proximity sensing data to a beacon management service (304). For example, the client device can send proximity sensing data to centralized beacon management service 112 over the air (OTA), as described in reference to FIG. 1. More particularly, the proximity sensing data can be sent as a data packet over WiFi AP 108 or cell tower 120 and gateway 122 to wide area network 110 (e.g., Internet), where the packet can be received by beacon management service 112. If the PDU type is "connectable," a secure bi-directional connection (e.g., authenticated with a password) can be established with the beacon upon request of the client device. The bi-directional connection allows the client device to receive beacon information from beacon management service 112 over a short-range communication channel between the beacon and the client device (e.g., a Bluetooth® connection).

Process 300 can continue by receiving beacon information associated with the proximity sensing data (306). For example, a proximity ID or other proximity sensing data can be used to index a database table (FIG. 2A, 2B) in beacon database 124 to access beacon information associated with the beacon. The beacon information can be sent in a data packet to the client device over a data communication channel (e.g., WiFi, cellular).

Process 300 can continue by an operating system running on the client device directing the beacon information to the appropriate application (308). In some implementations, the application can be dormant on the client device and awakened by the operating system when the data packet is received. The application can use the beacon information to provide messages and other useful information to the user of the client device.

Figure 4:
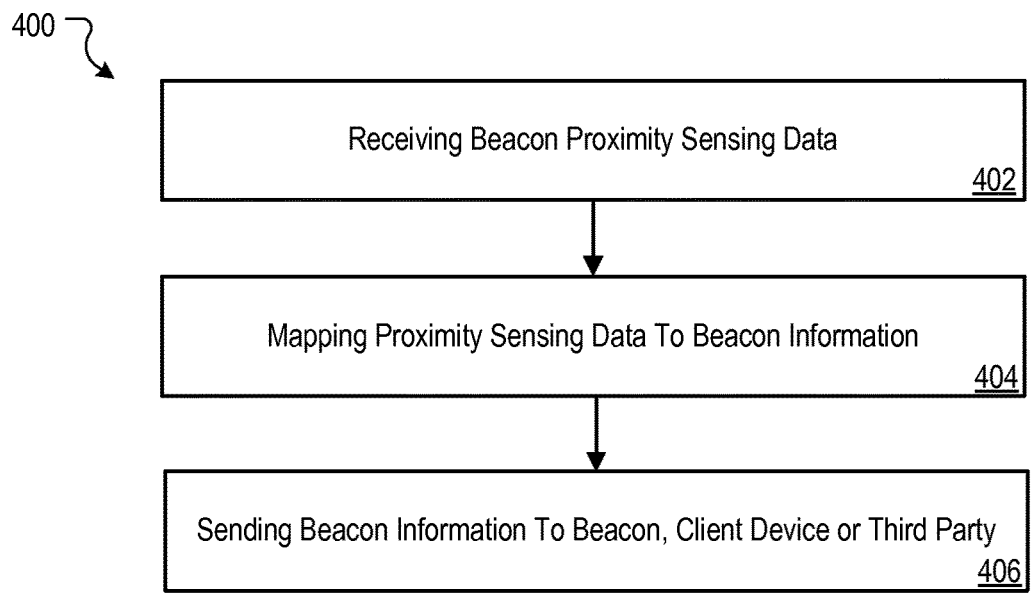
FIG. 4 is an example process performed by the beacon management service illustrated in FIG. 1.

FIG. 4 is an example process performed by the beacon management service illustrated in FIG. 1. Process 400 can be implemented by one or more server computers, which can have the example server architecture 800 as described in reference to FIG. 8.

In some implementations, process 400 can begin by receiving proximity sensing data from a client device or a beacon over a data communications channel (402), as described in reference to FIG. 1. The data can be sent as a data packet with a header and payload.

Process 400 can continue by mapping the proximity sensing data to beacon information in a database table in a beacon database (404). For example, a proximity ID or other proximity sensing data can be used to index a database table associated with the beacon to retrieve beacon information. In some implementations, the beacon information can be included in the database table. In other implementations, the beacon information can include a link to another database table, data store or system (e.g., a content provider) where the beacon information is stored.

Process 400 can continue by sending the beacon information to one or more of the beacon, the client device or a third party system (408). A third party system can be, for example, a content aggregator (e.g., iTunes® store or App® store) or a system run by an enterprise (e.g., ad targeting system)

In some implementations, the proximity sensing data includes a range class estimation computed by the client device (Far, Near, Immediate). The range class estimation can be used to select beacon information that is specific to an estimated range class. For example, an enterprise may want to deliver a first message only to client devices that are "Far" from a particular beacon, a second message only to client devices that are "Near" to the particular beacon and a third message only to client devices that are "Immediate" to the particular beacon. The first, second and third messages can all be different based on the preferences of the enterprise that deployed the beacon. A description of range class estimation can be found in co-pending U.S. patent application Ser. No. 13/905,552, filed May 30, 2013, for "Range Class Estimation For Radio Frequency Devices," which patent application is incorporated by reference herein in its entirety.

Example Client Device User Interfaces

Figures 5A, 5B, 5C:
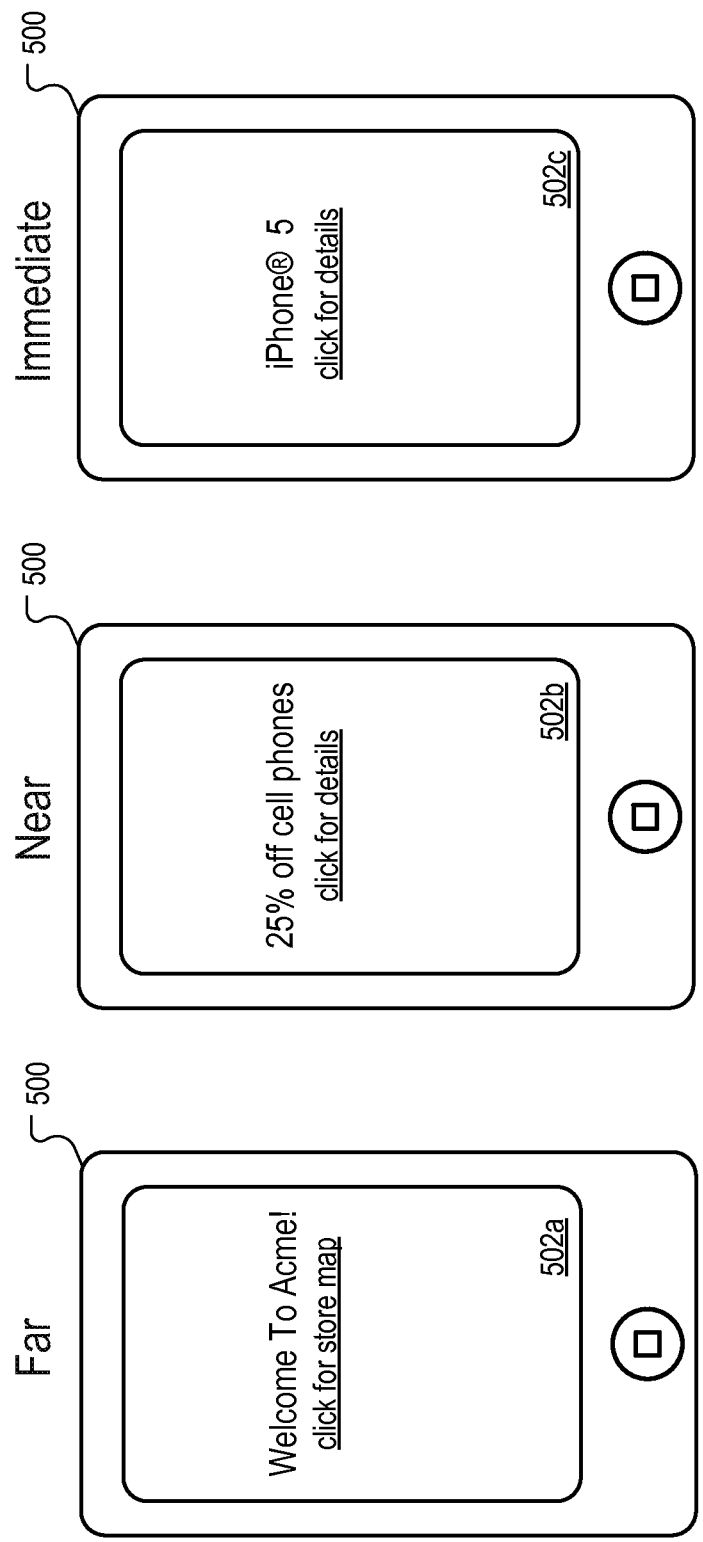
FIGS. 5A-5C illustrates a user interface of a client device for displaying advertisement messages based on estimated range class.

FIGS. 5A-5C illustrates a user interface of client device 500 for displaying advertisement messages based on estimated range class. Referring to FIG. 5A, a customer that is physically proximate to the entrance of an Acme store may receive a message "Welcome To Acme!" In this example, client device 500 is operating in scan mode and detects a first beacon at the entrance of the store. This detection causes a dormant application (e.g., an Acme application) to awaken and communicate with an Acme push notification server through, for example, a WiFi AP coupled to an Internet backbone. The message also includes a link to access a store map (e.g., a floorplan). Client device 500 receives the message from the push notification server and displays the message on user interface (UI) 502a.

FIG. 5B is an example message "25% off cell phones" that may be displayed on UI 502b when client device 500 is physically proximate to a second beacon at the electronics section of the store. The message also includes a link to access more details regarding the discount.

FIG. 5C is an example message "iPhone® 5" that may be displayed on UI 502c when client 500 is physically proximate to a third beacon at a cell phone display in the electronics section. The message also includes a link to access more details regarding the iPhone® 5.

Example Beacon Manager Portal

Figure 6:
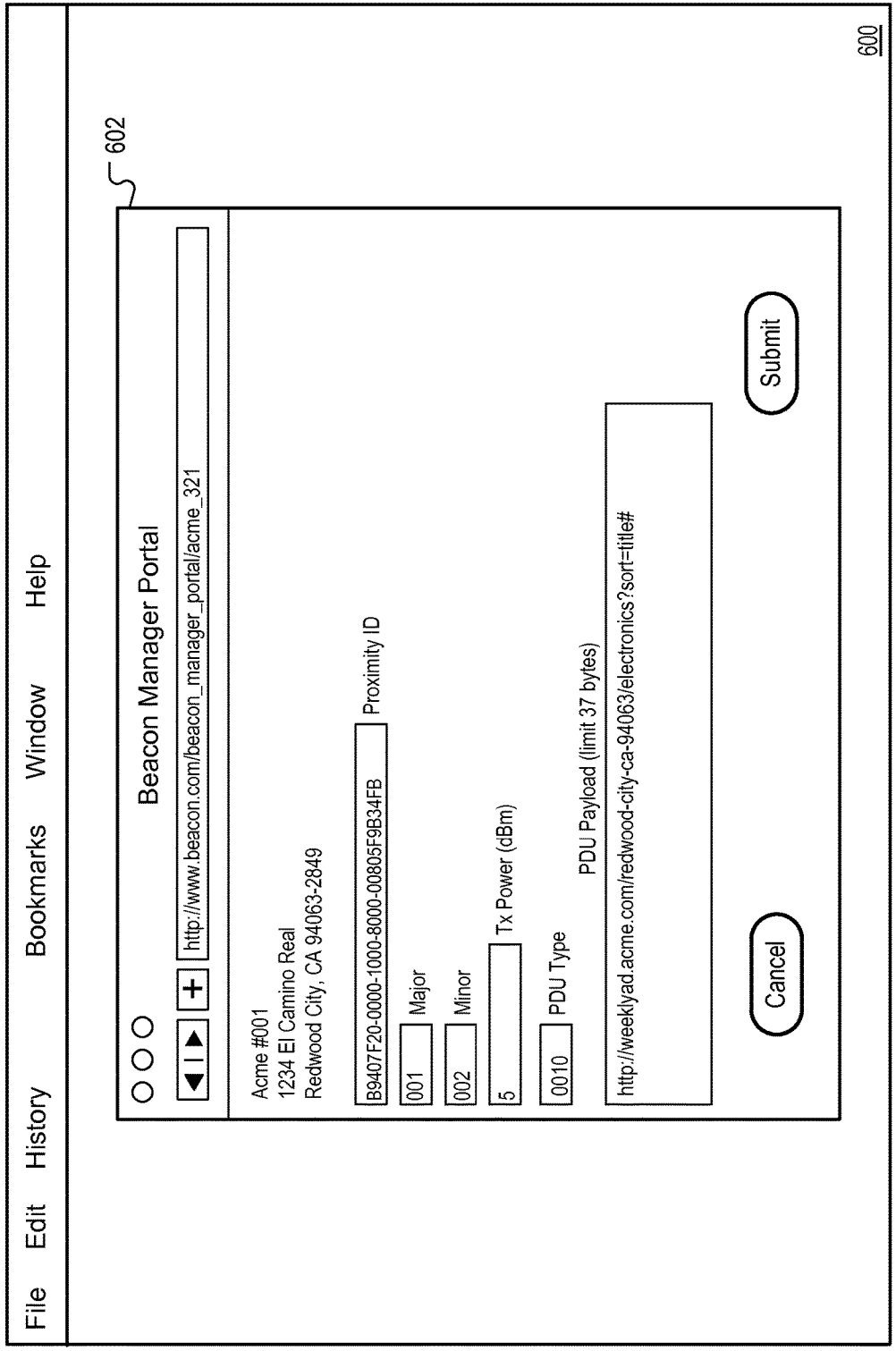
FIG. 6 is illustrates a beacon management portal presented in a browser window of an administrator computer.

FIG. 6 is illustrates a beacon management portal presented in a browser window of an administrator computer. In some implementations, beacon management service 112 can provide a beacon manager portal to enterprises for allowing administrators to commission beacons and to specify a proximity profile. A "proximity profile" can be a proximity profile described in the BT Specification or a proprietary proximity profile, such as iBeacon® protocol. The proximity profile can include beacon information and any other information that can be used to manage or control the interaction of beacons with client devices, including without limitation the delivery of services and content to client devices directly or indirectly through the beacons.

Referring to FIG. 6, desktop 600 of an administrator computer (e.g., a personal computer, smart phone, tablet computer) includes browser window 602 displaying a beacon management user interface (UI) for Acme Corporation. The UI is merely illustrative and other UI designs can also be used. In the example UI, the enterprise administrator can use text boxes to specify beacon information for each beacon in a beacon environment (a retail chain store), including proximity ID, major/minor values, transmission power, PDU type and a PDU payload. Once the beacon information is specified, the administrator can submit the information to centralized beacon management service 112. Beacon management service 112 can establish the appropriate data communication channels and connections with the beacons and programs the beacons with the beacon information. Accordingly, the UI allows an enterprise to manage beacon-related advertising and services using a centralized beacon management service that provides flexibility and scalability.

Example Client Architecture

Figure 7:
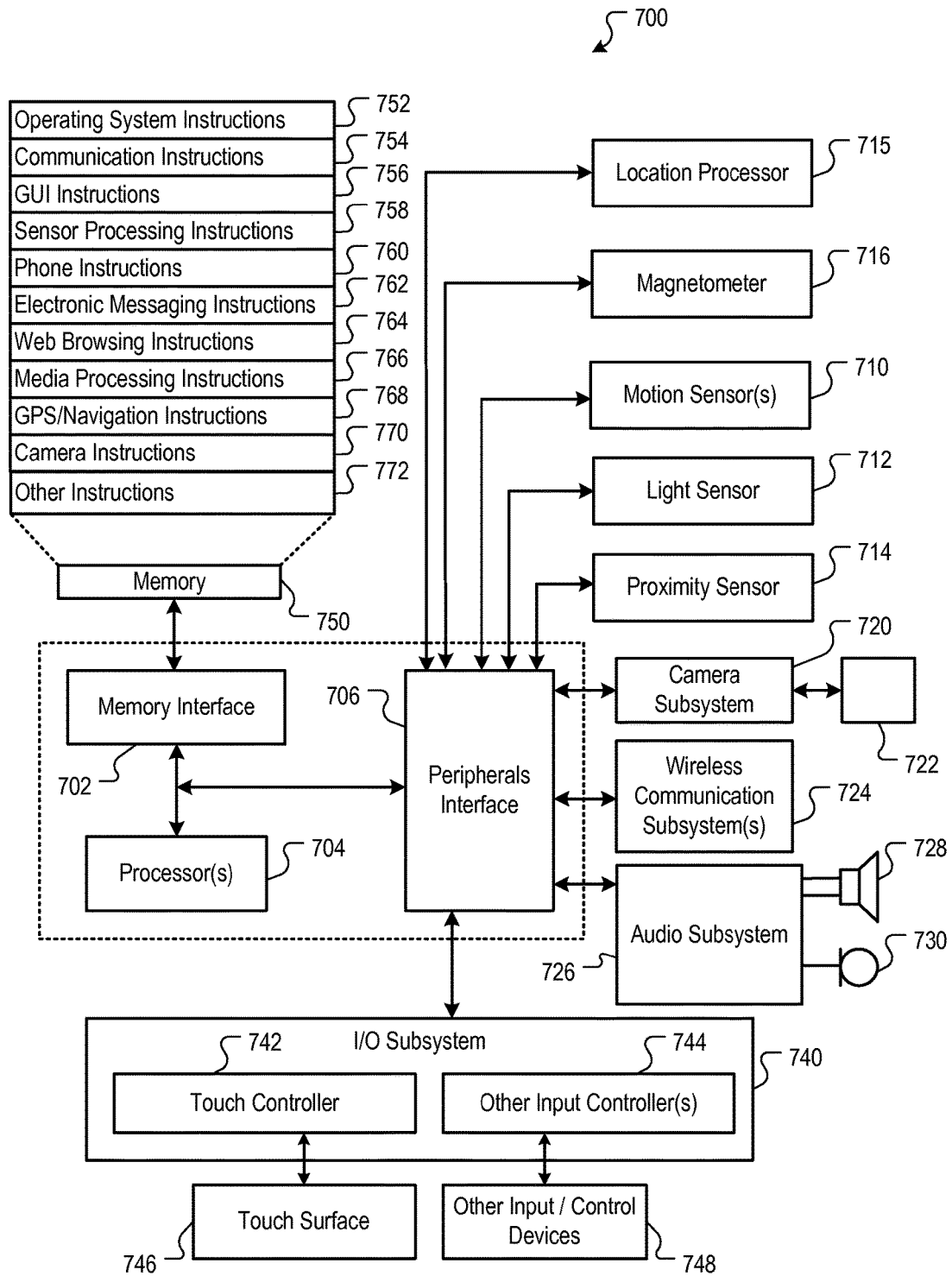
FIG. 7 is a block diagram of example client device architecture for implementing the features and processes described in reference to FIGS. 1-6.

FIG. 7 is a block diagram of example client device architecture 700 for implementing the features and processes described in reference to FIGS. 1-6. Architecture 700 may be implemented in any mobile device for implementing the features and processes described in reference to FIGS. 1-6, including but not limited to portable computers, smart phones and tablet computers, game consoles, wearable computers and the like. Architecture 700 may include memory interface 702, data processor(s), image processor(s) or central processing unit(s) 704, and peripherals interface 706. Memory interface 702, processor(s) 704 or peripherals interface 706 may be separate components or may be integrated in one or more integrated circuits. One or more communication buses or signal lines may couple the various components.

Sensors, devices, and subsystems may be coupled to peripherals interface 706 to facilitate multiple functionalities. For example, motion sensor 710, light sensor 712, and proximity sensor 714 may be coupled to peripherals interface 706 to facilitate orientation, lighting, and proximity functions of the device. For example, in some implementations, light sensor 712 may be utilized to facilitate adjusting the brightness of touch surface 746. In some implementations, motion sensor 710 (e.g., an accelerometer, gyros) may be utilized to detect movement and orientation of the device. Accordingly, display objects or media may be presented according to a detected orientation (e.g., portrait or landscape). Other sensors may also be connected to peripherals interface 706, such as a temperature sensor, a biometric sensor, or other sensing device, to facilitate related functionalities.

Location processor 715 (e.g., GPS receiver chip) may be connected to peripherals interface 706 to provide georeferencing. Electronic magnetometer 716 (e.g., an integrated circuit chip) may also be connected to peripherals interface 706 to provide data that may be used to determine the direction of magnetic North. Thus, electronic magnetometer 716 may be used with an electronic compass application.

Camera subsystem 720 and an optical sensor 722, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 724. Communication subsystem(s) 724 may include one or more wireless communication subsystems. Wireless communication subsystems 724 may include radio frequency receivers and transmitters and/or optical (e.g., infrared) receivers and transmitters. Wired communication systems 724 may include a port, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 724 may depend on the communication network(s) or medium(s) over which the device is intended to operate. For example, a device may include wireless communication subsystems designed to operate using known or standardized protocols, including but not limited to: global system for mobile communications (GSM), GPRS, enhanced data GSM environment (EDGE), IEEE 802.x (e.g., WiFi, WiMax), code division multiple access (CDMA), Near Field Communications (NFC), Bluetooth® (including classic Bluetooth® and Bluetooth® low energy (BLE)). Wireless communication subsystems 724 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known or standardized protocol.

Audio subsystem 726 may be coupled to a speaker 728 and one or more microphones 730 to facilitate voice-enabled functions, such as voice recognition, voice replication, digital recording, and telephony functions.

I/O subsystem 740 may include touch controller 742 and/or other input controller(s) 744. Touch controller 742 may be coupled to a touch surface 746. Touch surface 746 and touch controller 742 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 746. In one implementation, touch surface 746 may display virtual or soft buttons and a virtual keyboard, which may be used as an input/output device by the user.

Other input controller(s) 744 may be coupled to other input/control devices 748, such as one or more buttons, rocker switches, thumb-wheel, infrared port, USB port, and/or a pointer device such as a stylus. The one or more buttons (not shown) may include an up/down button for volume control of speaker 728 and/or microphone 730.

In some implementations, device 700 may present recorded audio and/or video files, such as MP3, AAC, and MPEG video files. In some implementations, device 700 may include the functionality of an MP3 player and may include a pin connector for tethering to other devices. Other input/output and control devices may be used.

Memory interface 702 may be coupled to memory 750. Memory 750 may include high-speed random access memory or non-volatile memory, such as one or more magnetic disk storage devices, one or more optical storage devices, or flash memory (e.g., NAND, NOR). Memory 750 may store operating system 752, such as Darwin, RTXC, LINUX, UNIX, OS X, WINDOWS or an embedded operating system such as VxWorks. Operating system 752 may include instructions for handling basic system services and for performing hardware dependent tasks. In some implementations, operating system 752 may include a kernel (e.g., UNIX kernel).

Memory 750 may also store communication instructions 754 to facilitate communicating with one or more additional devices, one or more computers or servers, including peer-to-peer communications, as described in reference to FIGS. 1-6. Communication instructions 754 may also be used to select an operational mode or communication medium for use by the device, based on a geographic location (obtained by the GPS/Navigation instructions 768) of the device. Memory 750 may include graphical user interface instructions 756 to facilitate graphic user interface processing, including a touch model for interpreting touch inputs and gestures; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes; camera instructions 770 to facilitate camera-related processes and functions; and other instructions 772 for performing some or all of the processes, as described in reference to FIGS. 1-6.

Each of the above identified instructions and applications may correspond to a set of instructions for performing one or more functions described above. These instructions need not be implemented as separate software programs, procedures, or modules. Memory 750 may include additional instructions or fewer instructions. Furthermore, various functions of the device may be implemented in hardware and/or in software, including in one or more signal processing and/or application specific integrated circuits (ASICs).

Example Server Architecture

Figure 8:
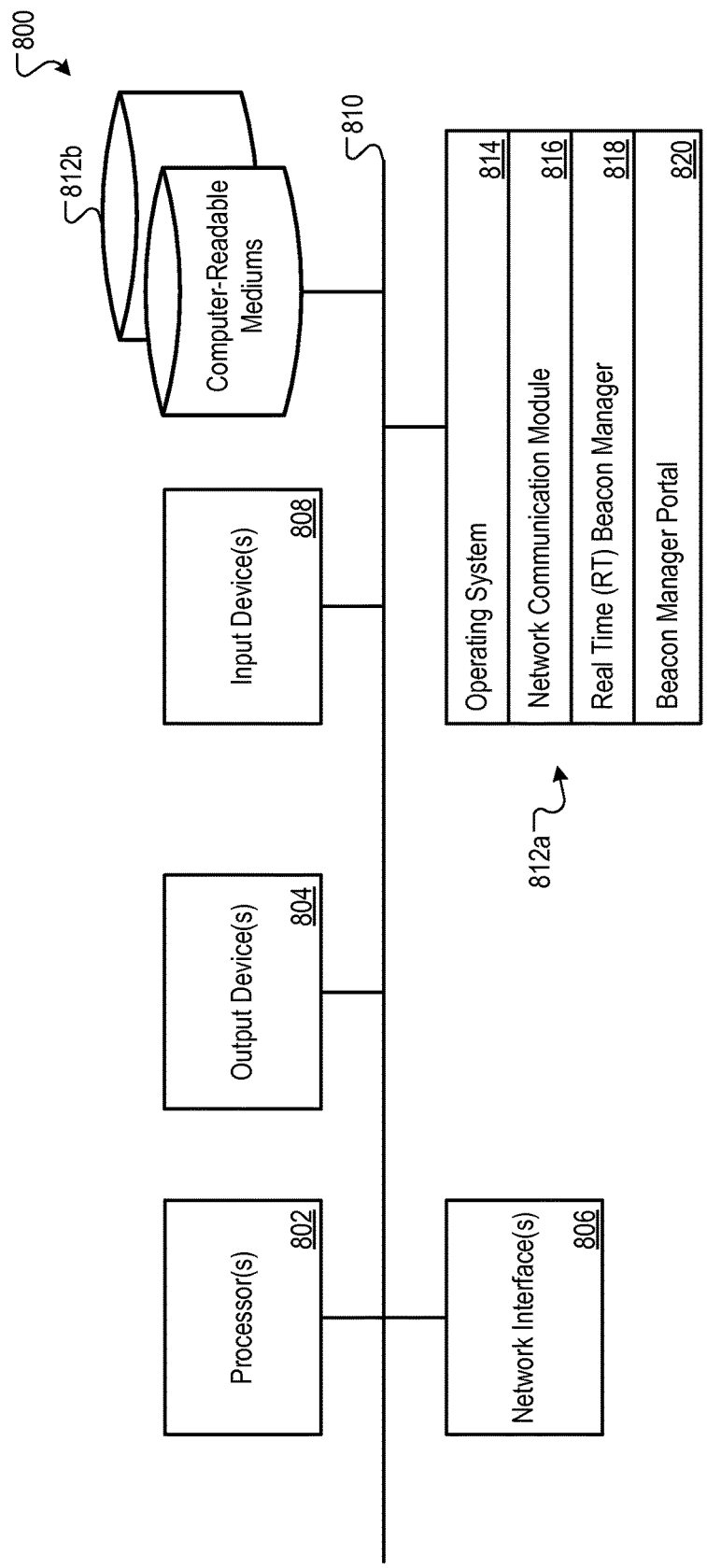
FIG. 8 is a block diagram of example server computer architecture for implementing the features and processes described in reference to FIGS. 1-6.

FIG. 8 is a block diagram of example server computer architecture 800 for implementing the features and processes described in reference to FIGS. 1-6. Other architectures are possible, including architectures with more or fewer components. In some implementations, architecture 800 includes one or more processors 802 (e.g., dual-core Intel® Xeon® Processors), one or more output devices 804 (e.g., LCD), one or more network interfaces 806, one or more input devices 808 (e.g., mouse, keyboard, touch-sensitive display) and one or more computer-readable mediums 812 and memory 813 (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "computer-readable medium" refers to any medium that participates in providing instructions to processor 802 for execution, including without limitation, non-volatile media (e.g., optical or magnetic disks), volatile media (e.g., memory) and transmission media. Transmission media includes, without limitation, coaxial cables, copper wire and fiber optics.

Computer-readable mediums 812 or memory 813 can further include operating system 814 (e.g., Mac OS® server, Windows® NT server), network communication module 816, real time beacon manager module 818 and beacon manager portal module 820. Operating system 814 can be multi-user, multiprocessing, multitasking, multithreading, real time, etc. Operating system 814 performs basic tasks, including but not limited to: recognizing input from and providing output to devices 804; keeping track and managing files and directories on storage devices 812*b* and memory 812*a*; controlling peripheral devices; and managing traffic on the one or more communication channels 810.

Network communications module 816 includes various components for establishing and maintaining network connections (e.g., software for implementing communication protocols, such as TCP/IP, HTTP, etc.). Beacon manager module 818 performs real time beacon commissioning and other beacon services as described in reference to FIGS. 1-6. Beacon manage portal module 820 provides a web portal to enterprises as described in reference to FIGS. 1-6. Beacon manage portal module 820 can also establish a web feed (e.g., XML feed) to beacon management service 112 from enterprise computer systems.

Architecture 800 can be included in any computer device, including one or more server computers each having one or more processing cores. Architecture 800 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
 receiving, by a server computer, proximity sensing data aggregated by a client device physically proximate to a beacon in a beacon environment associated with an enterprise, the proximity sensing data including data identifying the beacon environment, the beacon, and an estimated range class, the estimated range class indicating a proximity of the client device to the beacon;
 retrieving, by the server computer, beacon information from a database of a centralized beacon management service using the proximity sensing data, the beacon information associated with the enterprise, the location of the beacon environment and the estimated range class;
 selecting a message to send to the client device based on the estimated range class and contents of a range class field in the database; and
 sending the message to the client device over a communication link that is different than a communication link between the client device and the beacon.

2. The method of claim 1, where the beacon is a bluetooth low energy (BLE) beacon, the data identifying the beacon environment is a major value and the data identifying the beacon is a minor value.

3. The method of claim 1, further comprising:
 using a proximity identifier (ID) included in the proximity sensing data to associate the beacon with the enterprise.

4. The method of claim 1, further comprising:
 providing the enterprise with access to a web portal; and
 receiving beacon information from the enterprise through the web portal.

5. The method of claim 1, where the beacon information includes a message or link to be broadcast by the beacon.

6. The method of claim 1, further comprising:
 providing the enterprise with a data feed; and
 receiving beacon information from the enterprise through the data feed.

7. The method of claim 1, where the beacon information includes a transmission power parameter for adjusting the transmission power of the beacon.

8. The method of claim 1, where the beacon information includes a protocol data unit (PDU) type parameter.

9. The method of claim 1, where the beacon information is sent and received over a communication link that is different than a communication link between the client device and the beacon.

10. A system comprising:
 one or more processors;
 memory coupled to the one or more processors and storing instructions, which, when executed by the one or more processors, causes the one or more processors to perform operations comprising:
  receiving proximity sensing data aggregated by a client device physically proximate to a beacon in a beacon environment associated with an enterprise, the proximity sensing data including data identifying the beacon environment, the beacon, and an estimated range class, the estimated range class indicating a proximity of the client device to the beacon;
  retrieving beacon information from a database of a centralized beacon management service using the proximity sensing data, the beacon information associated with the enterprise, the location of the beacon environment and the estimated range class;
  selecting a message to send to the client device based on the estimated range class and contents of a range class field in the database; and
  sending the message to the client device over a communication link that is different than a communication link between the client device and the beacon.

11. The system of claim 10, where the beacon is a bluetooth low energy (BLE) beacon, the data identifying the beacon environment is a major value and the data identifying the beacon is a minor value.

12. The system of claim 10, where the memory stores instructions, which, when executed by the one or more processors, causes the one or more processors to perform operations comprising:
 selecting a message to send to the client device based on the estimated range class and contents of a range class field in the database; and
 sending the message to the client device over a communication link that is different than a communication link between the client device and the beacon.

13. The system of claim 10, where the memory stores instructions, which, when executed by the one or more processors, causes the one or more processors to perform operations comprising:

using a proximity identifier (ID) included in the proximity sensing data to associate the enterprise with the beacon.

14. The system of claim 10, where the memory stores instructions, which, when executed by the one or more processors, causes the one or more processors to perform operations comprising:

providing the enterprise with access to a web portal; and
receiving beacon information from the enterprise through the web portal.

15. The system of claim 10, where the beacon information includes a message or link to be broadcast by the beacon.

16. The system of claim 10, where the memory stores instructions, which, when executed by the one or more processors, causes the one or more processors to perform operations comprising:

providing the enterprise with a data feed; and
receiving beacon information from the enterprise through the data feed.

17. The system of claim 10, where the beacon information includes a transmission power parameter for adjusting the transmission power of the beacon.

18. The system of claim 10, where the beacon information includes a protocol data unit (PDU) type parameter.

19. The system of claim 10, where the beacon information is sent and received over a communication link that is different than a communication link between the client device and the beacon.

20. A non-transitory, computer-readable storage medium having instructions stored thereon, which, when executed by one or more processors, cause the one or more processors to perform operations comprising:

receiving, by a server computer, proximity sensing data aggregated by a client device physically proximate to a beacon in a beacon environment associated with an enterprise, the proximity sensing data including data identifying the beacon environment, the beacon, and an estimated range class, the estimated range class indicating a proximity of the client device to the beacon;

retrieving, by the server computer, beacon information from a database of a centralized beacon management service using the proximity sensing data, the beacon information associated with the enterprise, the location of the beacon environment and the estimated range class;

selecting a message to send to the client device based on the estimated range class and contents of a range class field in the database; and sending the message to the client device over a communication link that is different than a communication link between the client device and the beacon.

* * * * *